(12) United States Patent
Hooper et al.

(10) Patent No.: US 8,619,607 B2
(45) Date of Patent: Dec. 31, 2013

(54) METHOD AND SYSTEM FOR VERIFYING LOGICAL CONNECTION

(75) Inventors: Harold Scott Hooper, Vancouver, WA (US); Eric Thomas Olbricht, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 133 days.

(21) Appl. No.: 12/928,771

(22) Filed: Dec. 17, 2010

(65) Prior Publication Data

US 2011/0099279 A1   Apr. 28, 2011

Related U.S. Application Data

(62) Division of application No. 11/807,275, filed on May 25, 2007, now Pat. No. 7,881,329.

(51) Int. Cl.
*G01R 31/08* (2006.01)
*G06F 15/177* (2006.01)
*G06F 15/16* (2006.01)

(52) U.S. Cl.
USPC ............... 370/252; 709/222; 709/228; 726/4

(58) Field of Classification Search
USPC .............. 370/230–235, 236–236.2, 248–249, 370/252–253, 449–450, 457, 477; 709/203, 709/222, 225–229, 237; 380/227–278, 283; 726/3–4

See application file for complete search history.

(56) References Cited

U.S. PATENT DOCUMENTS

| 5,029,164 | A | 7/1991 | Goldstein et al. ............ 370/235 |
| 5,917,822 | A * | 6/1999 | Lyles et al. ................ 370/395.4 |
| 6,336,115 | B1 * | 1/2002 | Tominaga et al. ................... 1/1 |
| 6,581,166 | B1 | 6/2003 | Hirst et al. ......................... 714/4 |
| 6,668,282 | B1 | 12/2003 | Booth et al. ................... 709/224 |
| 6,754,621 | B1 | 6/2004 | Cunningham et al. ........ 704/219 |
| 6,769,023 | B1 | 7/2004 | Novaes et al. ................ 709/224 |
| 2003/0131129 | A1 | 7/2003 | Becker et al. ................. 709/238 |
| 2003/0188195 | A1 | 10/2003 | Abdo et al. ................... 713/201 |
| 2005/0021737 | A1 * | 1/2005 | Ellison et al. ................. 709/224 |
| 2005/0027818 | A1 | 2/2005 | Friedman et al. ............. 709/217 |
| 2005/0120204 | A1 * | 6/2005 | Kiwimagi et al. ............ 713/156 |
| 2005/0132222 | A1 * | 6/2005 | Petrovic ........................ 713/201 |
| 2005/0243719 | A1 * | 11/2005 | Haverinen et al. ............ 370/230 |
| 2006/0155855 | A1 * | 7/2006 | Hamai ........................... 709/227 |
| 2006/0218609 | A1 | 9/2006 | Johnson ........................ 380/270 |
| 2007/0115846 | A1 | 5/2007 | Kooyers et al. ............... 370/252 |
| 2007/0180077 | A1 | 8/2007 | Letca et al. ................... 709/223 |

FOREIGN PATENT DOCUMENTS

| GB | 2323458 | 9/1998 |
| JP | 2006/086583 | 3/2006 |

* cited by examiner

*Primary Examiner* — Redentor Pasia
(74) *Attorney, Agent, or Firm* — Scot A. Reader

(57) ABSTRACT

A method and system for maintaining a high reliability logical connection between hosts employs adaptive transparent pinging, clone blocking and bandwidth leveling to realize improvements in the areas of connection status verification, security and bandwidth management. In adaptive transparent pinging, a ping interval that defines a frequency at which ping messages are transmitted from an initiating host to a receiving host to check connection status is dynamically regulated based on data indicative of the reliability of a connection. In clone blocking, the receiving host verifies that a new connection that appears redundant is a re-established connection from the initiating host rather than a cloned connection. In bandwidth leveling, data bursts pending on initiating hosts that exceed a predetermined size are scheduled for transmission to receiving hosts.

9 Claims, 5 Drawing Sheets

METHOD AND SYSTEM FOR VERIFYING LOGICAL CONNECTION

CROSS-REFERENCE TO RELATED APPLICATION

This application is a division of U.S. application Ser. No. 11/807,275 entitled "METHOD AND SYSTEM FOR MAINTAINING HIGH RELIABILITY LOGICAL CONNECTION," filed on May 25, 2007 now U.S. Pat. No. 7,881,329.

BACKGROUND OF THE INVENTION

The present invention relates to network connection maintenance and, more particularly, to a method and system for maintaining a high reliability logical connection.

Many client-server and peer-to-peer software applications require a logical connection to be maintained between hosts over an often unreliable heterogeneous network topology such as the Internet. This requirement presents a problem in that intermediate networking elements, such as firewalls, can block connection requests and data traffic transmitted on logical connections. Additionally, an undetected loss of connectivity can occur at any time due to a hardware or software failure on or between intermediate networking elements, or due to severe congestion.

The problem of a firewall blocking connection requests and data traffic has sometimes been addressed by opening the firewall to allow connection requests and data traffic having specific identifiers, for example, particular Internet Protocol (IP) addresses and Transport Control Protocol (TCP) port numbers. However, opening the firewall to such connection requests and data traffic leaves the hosts vulnerable to cloned connections initiated by cloned processes and rogue computers that spoof identifiers to gain access to the hosts and oftentimes infect them with malicious code.

The problem of undetected connectivity loss has sometimes been addressed through "keep alive" messaging. For example, some TCP implementations have one host poll another host by sending a "keep alive" message to the polled host after a connection has been idle for an idle connection interval. If the polled host fails to acknowledge the "keep alive" message within an acknowledgment interval, the connection is presumed to have been lost. While useful, known "keep alive" messaging protocols have generally not taken into account the reliability of the connection when setting the idle connection interval, resulting in connection status checks that have often been more or less frequent than warranted. Moreover, TCP "keep alive" messaging requires use of a specific communication protocol, namely TCP, between the hosts.

SUMMARY OF THE INVENTION

The present invention, in a basic feature, provides an improved method and system for maintaining a high reliability logical connection between hosts. Improvements are realized in the areas of connection status verification, security and bandwidth management.

In one aspect, the present invention provides improved connection status verification through adaptive transparent pinging. In adaptive transparent pinging, a ping interval that defines a frequency at which ping messages are transmitted from an initiating host (hereinafter "initiator") to a receiving host (hereinafter "recipient") to check connection status is dynamically adjusted based on data indicative of the reliability of a connection, resulting in a methodology that when judiciously applied strikes an appropriate balance between the competing goals of prompt detection of connectivity loss and bandwidth conservation. In some embodiments, the ping interval is adapted to drop quickly as a connection becomes less reliable, but never falls below a minimum so as not to consume too much bandwidth; and is adapted to rise slowly as a connection becomes more reliable. Moreover, in adaptive transparent pinging, ping messages include data indicative of the current ping interval, allowing the recipient to determine the likely status of a connection even if deployed in a network topology where a firewall or proxy inhibits the recipient from pinging the initiator. Additionally, adaptive transparent pinging can operate independently of TCP.

In another aspect, the present invention provides improved security through clone blocking. Adaptive transparent pinging may result in a temporary state where the initiator has detected a loss of connectivity but the recipient has not detected the loss of connectivity. This can prompt the initiator to re-establish a new connection that when re-established appears redundant to the recipient. In clone blocking, the recipient verifies that the new connection that appears redundant is a re-established connection from the initiator rather than a cloned connection initiated by, for example, a computer executing a backup process or a rogue computer that has spoofed identifiers in order to gain access to the recipient. If the recipient is unable to verify that the new connection that appears redundant is a re-established connection, the recipient may take a security action, such as dropping the new connection, dropping the new and old connection, notifying an administrator and/or disabling an account. In some embodiments, clone blocking is achieved by transmitting from the initiator to the recipient on a first instance of a connection a random session number, applying a common scheme on the initiator and the recipient to independently generate on the initiator and the recipient a second session number based on the random session number, transmitting from the initiator to the recipient on a second instance of the connection the second session number generated on the initiator and comparing for a match on the recipient the second session number generated on the initiator with the second session number generated on the recipient. Once a match is found, the recipient can safely presume that the second instance of the connection is a re-established connection from the initiator, and not a cloned connection.

In another aspect, the present invention provides improved bandwidth management through bandwidth leveling. Certain software applications require a recipient to maintain high reliability connections with many initiators simultaneously. Without proper bandwidth management, data traffic transmitted on these simultaneous connections can cause severe congestion and even loss of connectivity. In bandwidth leveling, data bursts pending on initiators that exceed a predetermined size must be scheduled for transmission to the recipient. In some embodiments, when the initiator has a data burst over a predetermined size to transmit to the recipient, the initiator sends to the recipient a transmission request indicating the size of the data burst. The recipient consults a schedule of data bursts and based on the schedule generates a transmission profile for the data burst and sends a transmission grant to the initiator including the transmission profile. The initiator transmits the data burst to the recipient in accordance with the transmission profile.

These and other aspects of the invention will be better understood by reference to the following detailed description

DETAILED DESCRIPTION OF A PREFERRED EMBODIMENT

Figure 1:
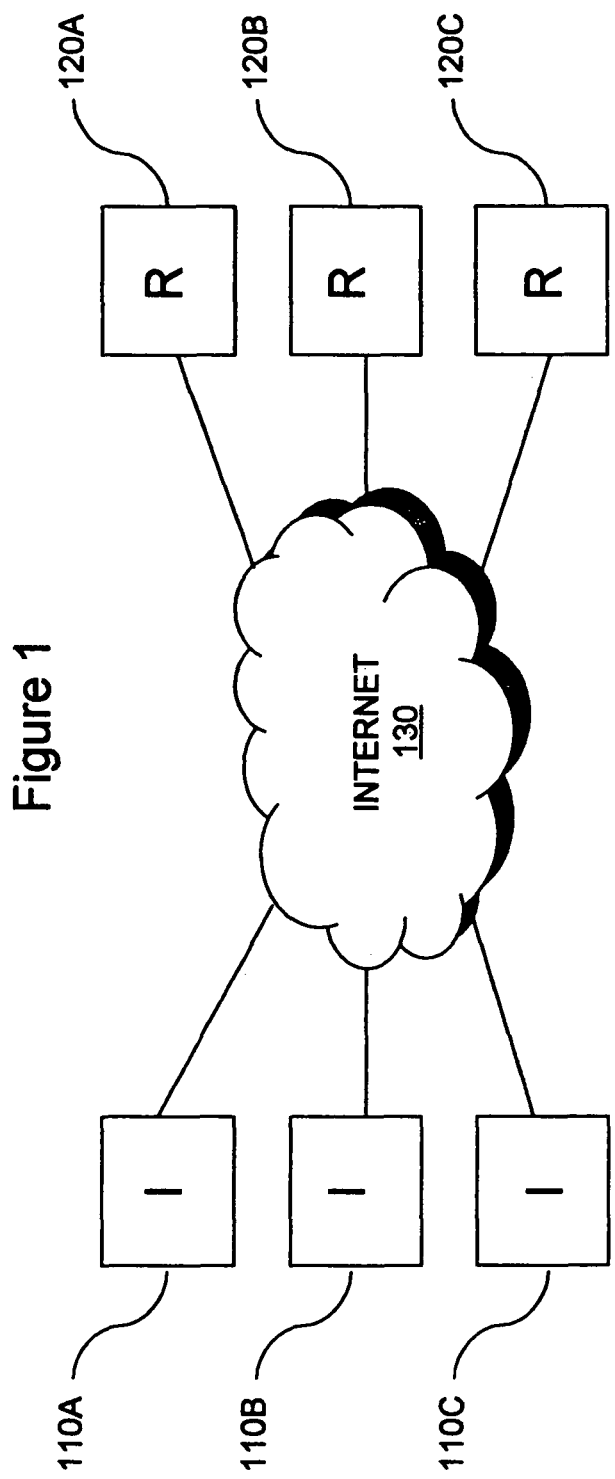
FIG. 1 shows a communication network in some embodiments of the invention.

In FIG. 1, a communication network in some embodiments of the invention is shown. The network includes initiating hosts (hereinafter "initiators") 110 and receiving hosts (hereinafter "recipients") 120 communicatively coupled over the Internet 130. Initiators 110 and recipients 120 may consist in one or more desktop and handheld network-capable electronic device types that execute software and/or firmware, such as personal computers, workstations, servers, mobile phones, personal data assistants (PDA), gaming consoles and multifunction printers, to name a few. Initiators 110 are responsible for establishing with recipients 120 over Internet 130 logical connections to support client-server or peer-to-peer software applications, for example. In some embodiments, logical connections are bidirectional connections that are established between an initiator and a recipient and maintained until such time as all messages to be exchanged between application software executing on the initiator and application software executing on the recipient have been exchanged. In some embodiments, logical connections are TCP/IP connections. While three initiators 110 and three recipients 120 are shown in FIG. 1 for simplicity, the number of initiators 110 and recipients 120 will vary by implementation. Moreover, a host may simultaneously serve an initiator for one or more logical connections and a recipient for one or more other logical connections. In addition to client-server or peer-to-peer software applications, initiators 110 and recipients 120 have one or more software programs executable by a processor and associated memory for performing the initiator and recipient functions, respectively, described herein.

Figure 2:
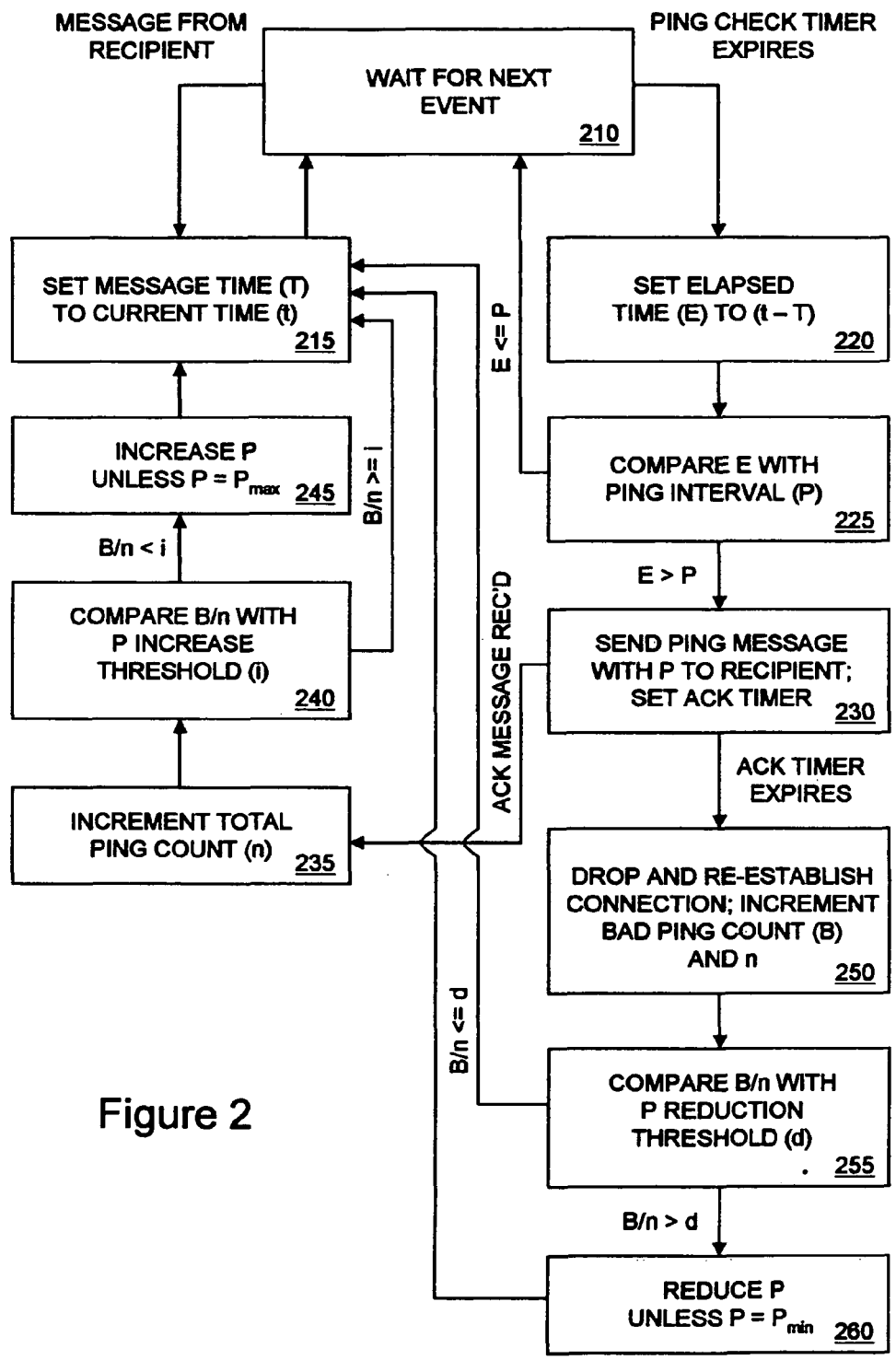
FIG. 2 shows an adaptive transparent pinging method performed by an initiator in some embodiments of the invention.

Turning to FIG. 2, an adaptive transparent pinging method performed by an initiator in some embodiments of the invention is shown. Adaptive transparent pinging is performed by an initiator to verify that a logical connection remains active after an idle interval in which no messages have been received on the connection. In adaptive transparent pinging, at a frequency defined by a current ping interval, an initiator sends to a recipient a ping message carrying the current ping interval. The initiator receives from the recipient an acknowledgement message responsive to the ping message within an acknowledgement interval or else drops and re-establishes the connection. Advantageously, in a departure from convention, the initiator also dynamically regulates the ping interval based on the reliability of the connection. Moreover, while dynamic adjustment of the ping interval would normally prevent the recipient from determining an expected time of arrival of the next ping message to assess connection status, inclusion of the current ping interval in each ping message advantageously allows the recipient to determine an expected time of arrival and likely connections status.

Consider, for example, a logical connection established between initiator 110A and recipient 120A. Upon establishment of the connection, initiator 110A enters a state where it awaits a next event (210). Events include receipt of a message from recipient 120A and expiration of a ping check timer. If the next event is receipt of a message from recipient 120A, initiator 110A sets the message time (T) to the current time (t) (215) and returns to the waiting state (210). In this regard, pings are only sent when recipient 120A has not been heard from for a defined interval. Setting the message time (T) to the current time (t) effectively postpones the next ping.

If the next event is expiration of a ping check timer, the elapsed time (E) is set to the current time (t) minus the message time (T) (220) and the elapsed time (E) is compared with the current ping interval (P) (225). If the elapsed time (E) is less than or equal to the current ping interval (P), the time for the next ping has not yet arrived and initiator 110A returns to the waiting state (210). If, however, the elapsed time (E) is greater than the current ping interval (P), the time for the next ping has arrived. In that event, initiator 110A sends a ping message including the current ping interval (P) to recipient 120A and sets an acknowledgment timer (230). In some embodiments, the ping message is carried in a Hyptertext Transfer Protocol (HTTP) header of a TCP/IP packet.

If an acknowledgement message is received from recipient 120A before the acknowledgement timer expires, that is, within the acknowledgement interval, the connection is still active. Since receipt of an acknowledgement message is indicative of reliability of the connection, initiator 110A considers whether an increase in the current ping interval (P) is warranted. Initiator 110A increments by one the total ping count (n) and compares a current ratio of bad pings (B) to total pings (n) with a ping interval increase threshold (i) (240). If the ratio (B/n) is greater than or equal to the threshold (i), the connection is considered not sufficiently reliable to increase the current ping interval (P). Initiator 110A thus sets the message time (T) to the current time (t) (215) and returns to await the next event (210) without increasing the current ping interval (P). If, on the other hand, the ratio (B/n) is less than the threshold (i), the connection is considered sufficiently reliable to increase the current ping interval (P). In that event, initiator 110A increases the current ping interval (P) using a predetermined algorithm, but without exceeding a maximum ping interval ($P_{max}$) (245), before setting the message time (T) to the current time (t) (215) and returning to await the next event (210).

If the acknowledgement timer expires before an acknowledgement message is received from recipient 120A, a loss of connectivity is presumed. Since a loss of connectivity is indicative of unreliability of the connection, initiator 110A considers whether a reduction in the current ping interval (P) is warranted. Initiator 110A drops and re-establishes the connection and increments by one the bad ping count (B) and the total ping count (n) (250). Initiator 110A then compares the ratio of bad pings (B) to total pings (n) with a ping interval reduction threshold (d) (255). If the ratio (B/n) is less than or equal to the threshold (d), the connection is considered not sufficiently unreliable to reduce the current ping interval (P). Initiator 110A thus sets the message time (T) to the current time (t) (215) and returns to await the next event (210) without reducing the current ping interval (P). If, on the other hand, the ratio (B/n) is greater than the threshold (d), the connection is considered sufficiently unreliable to reduce the current ping interval (P). In that event, initiator 110A reduces the current ping interval (P) using a predetermined algorithm, but without dropping below a minimum ping interval ($P_{min}$) (260), before setting the message time (T) to the current time (t) (215) and returning to await the next event (210).

In some embodiments, stale pings are not used in the reliability determination. For example, in some embodiments the bad ping count (B) and total ping count (n) account for only the most recent x pings, where x is a predetermined number such as 100. In other embodiments, pings time-out from the bad ping count (B) and the total ping count (n) after a predetermined interval.

In some embodiments, the ping interval increase threshold (i) is 0.1.

In some embodiments, the ping interval decrease threshold (p) is 0.1.

In some embodiments, the predetermined algorithm for decreasing the current ping interval (P) is P=P/2 and the minimum ping interval ($P_{min}$) is 10 seconds. In these embodiments the current ping interval (P) may be adjusted downward through application of the singular expression P=P/2+5 seconds. It will be appreciated that this algorithm causes a rapid decrease in the current ping interval (P) as a connection becomes less reliable, while never allowing the current ping interval (P) to fall below a minimum so as not to consume too much bandwidth. In other embodiments, the predetermined algorithm decreases the current ping interval (P) by subtracting a constant.

In some embodiments, the predetermined algorithm for increasing the current ping interval (P) is P=P+5 seconds and the maximum ping interval ($P_{max}$) is 1000 seconds. It will be appreciated that this algorithm causes a slow rise in the current ping interval (P) as a connection becomes more reliable, while preventing the current ping interval (P) to rise indefinitely. In other embodiments, the predetermined algorithm increases the current ping interval (P) by a constant multiplier.

In some embodiments, the acknowledgement interval is dynamically adjusted based on the elapsed time between transmission of ping messages and receipt of acknowledgment messages. For example, in some embodiments the acknowledgment interval is increased as the average elapsed time increases and is reduced as the average elapsed time decreases.

Figure 3:
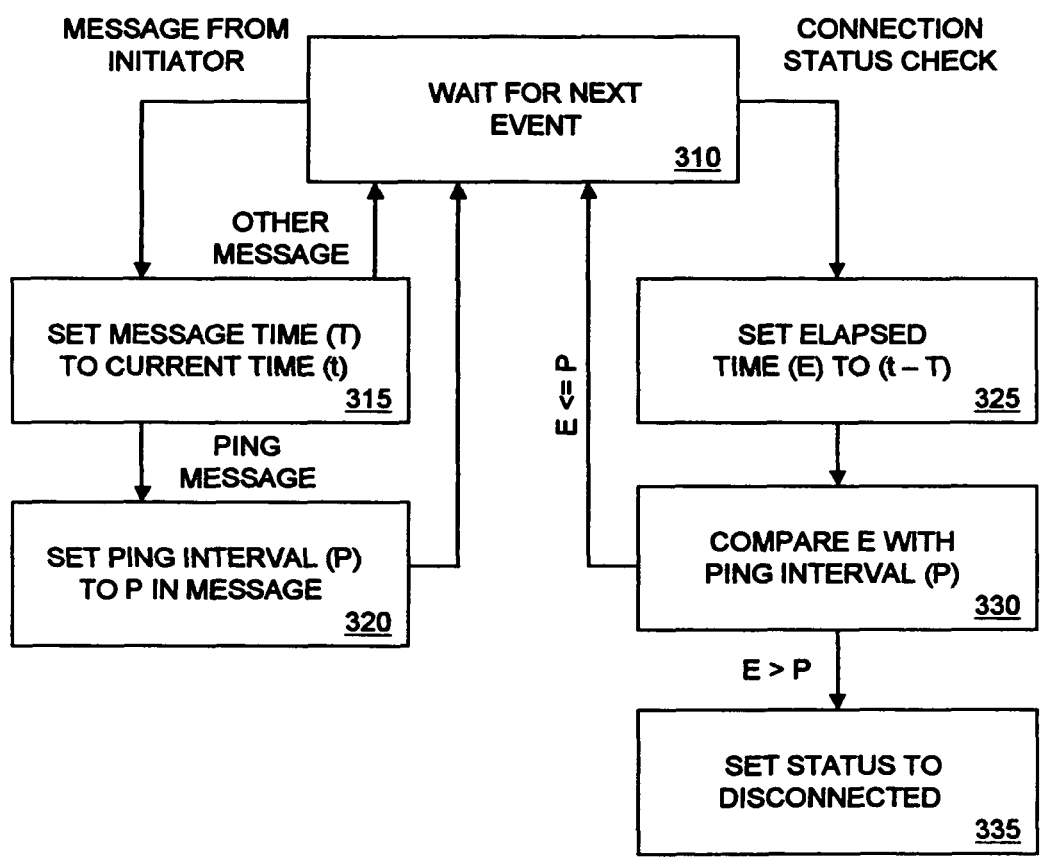
FIG. 3 shows a connection status check method performed by a recipient in some embodiments of the invention.

FIG. 3 shows a connection status check method performed by a recipient in some embodiments of the invention. Continuing with the above example, upon establishment of a connection, recipient 120A enters a state where it awaits a next event (310). Events include receipt of a message from initiator 110A and initiation of a connection status check. In some embodiments, a connection status check may be triggered by expiration of a connection status check timer. If the next event is receipt of a message from initiator 110A, recipient 120A sets the message time (T) to the current time (t) (315). In this regard, connection status checks determine likely connection status by reference to an expected time of arrival of the next ping message. Setting the message time (T) to the current time (t) effectively resets a timer that may later be compared with the expected time of arrival of the next ping message to determine likely status of the connection. If the message is not a ping message, recipient 120A returns to the waiting state (310). If, however, the message is a ping message, recipient 120A sets the current ping interval (P) to the ping interval carried in the message (320) before returning to the waiting state (310).

If the next event is a connection status check, the elapsed time (E) is set to the current time (t) minus the message time (T) (325) and the elapsed time (E) is compared with the current ping interval (P) (330). If the elapsed time (E) is less than or equal to the current ping interval (P), the time for the next ping has not yet arrived and recipient 120A returns to the waiting state (310). If, however, the elapsed time (E) is greater than the current ping interval (P), the time for the next ping has arrived. In that event, recipient 120A presumes that the connection has been lost and sets the connection status to disconnected (335).

In other embodiments, the elapsed time (E) is compared with an expanded ping interval that exceeds the current ping interval (P) carried in the latest ping message received by recipient 120A by a incremental amount to determine whether connectivity has likely been lost. In this regard, the current ping interval (P) on initiator 110A may have expanded by an incremental amount between transmission of the latest ping message received by recipient 120A and the next ping message due to receipt of an intervening acknowledgement message by initiator 110A. Using an expanded ping interval that exceeds the current ping interval (P) carried in the latest ping message received by recipient 120A in the comparison with the elapsed time (E) accounts for this potential expansion of the ping interval (P).

Figure 4:
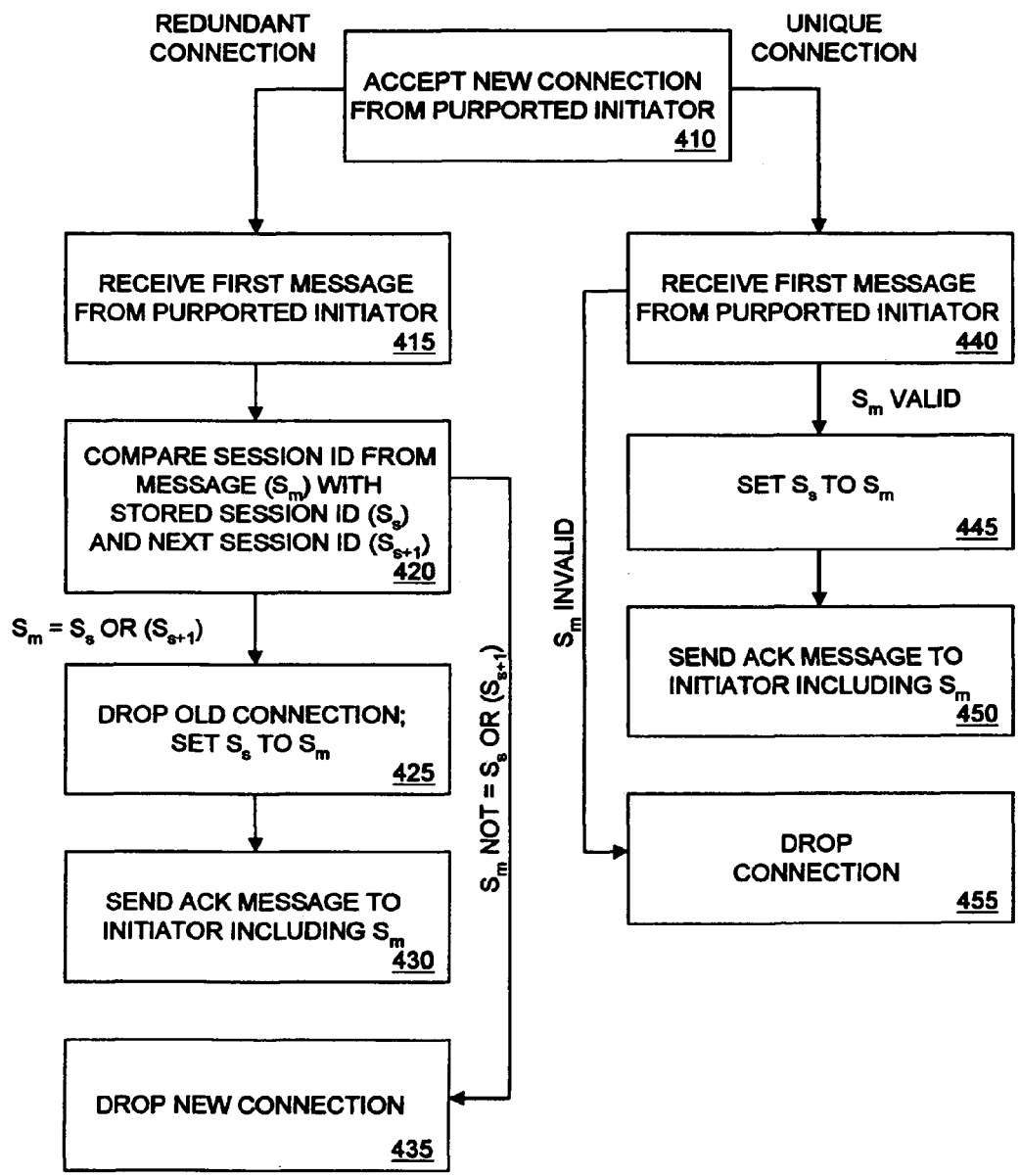
FIG. 4 shows a clone blocking method performed by a recipient in some embodiments of the invention.

FIG. 4 shows a clone blocking method performed by a recipient in some embodiments of the invention. Adaptive transparent pinging may result in a temporary state where an initiator has detected a loss of connectivity but a recipient has not detected the loss of connectivity. This can prompt the initiator to re-establish a connection that when re-established appears redundant to the recipient. In clone blocking, a distinct session number is assigned to each instance of a connection to allow the recipient to determine with a high degree of confidence whether a new connection that appears redundant is a re-established connection from the initiator or a cloned connection from, for example, a backup process or a rogue computer that has spoofed identifiers in order to gain malicious access to the recipient. If the recipient is unable to verify that a new connection that appears redundant is a re-established connection, the recipient adopts an implementation dependent security measure.

To enable clone blocking, a common scheme for updating session numbers is configured on an initiator and a recipient so that the initiator and recipient can independently generate common current session numbers from common previous session numbers. In some embodiments, the common scheme generates common current session numbers by incrementing common previous session numbers by one. In other embodiments, the common scheme generates common current session numbers by modifying common previous session numbers in accordance with a common algebraic or geometric progression other than incrementing by one. In still other embodiments, the common scheme generates common current session numbers by performing common bitwise logical operations on common previous session numbers. In still other embodiments, the common scheme generates common current session numbers by performing common table look-ups on a common previous session numbers.

Consider, for example, a new logical connection initiated by a purported initiator to recipient 120B. Recipient 120E authenticates the purported initiator by verifying a unique certificate, such as a Secure Socket Layer (SSL) certificate, for example, provided by the purported initiator, and accepts the new connection (410) if authentication is successful. However, such authentication does not preclude the possibility that the would-be initiator might be a host executing a cloned process, such as a backup process, or a rogue computer that has gained unauthorized access to the SSL certificate. Thus, recipient 120B considers whether the new connection is from the perspective of recipient 120B unique or redundant.

In some embodiments, recipient 1208 compares one or more identifiers associated with the new connection with corresponding identifiers associated with other active connections, determines that the new connection is redundant if there is a match between identifiers associated with the two connections, and determines that the new connection is unique if there is not a match between identifiers associated with the two connections. The identifiers that are compared may include one or more of an SSL certificate and an IP address, for example. If the new connection is determined by recipient 120B to be unique, upon receipt of a first message from the purported initiator on the connection (440), recipient 120E determines whether the first message carries a session number ($S_m$) that is valid. In some embodiments, recipient 120B compares a 32-bit string at a predetermined offset in an HTTP header of the first message with a range of valid session numbers to determine validity or invalidity. If the first message carries a session number ($S_m$) that is valid, recipient 120B sets a session number ($S_s$) stored on recipient 120B for the new connection to the session number ($S_m$) carried in the first message (445) and sends an acknowledgment message to the purported initiator including the session number ($S_m$) (450). If, on the other hand, the first message does not carry a session number ($S_m$) that is valid, recipient 120B drops the new connection (455).

Naturally, initiators 110 are configured to include a session number ($S_m$) in the first message transmitted on a new connection that will be recognized by recipients 120 as a valid session number so that recipients 120 will not drop the new connection. In some embodiments, the session number ($S_m$) generated by initiators 110 and carried in the first message transmitted on a new connection are 32-bit randomly generated numbers and recipients 120 are adapted to recognize any 32-bit number carried within a 32-bit string at a predetermined offset in an HTTP header of the first message of a new connection as valid. In other embodiments, the session number ($S_m$) generated and carried in the first message of a new connection must fall within a more specific range to be recognized by recipients 120 as a valid session number.

If the new connection is determined by recipient 120B to be redundant, a stored session number ($S_s$) for the connection already exists on recipient 120B by virtue of processing an earlier message carrying a session number ($S_m$) transmitted on another active connection having one or more common identifiers with the new connection. Thus, upon receipt of a first message from a purported initiator on a new connection that is redundant (415), recipient 120B applies the common scheme to determine the next stored session number ($S_{s+1}$) based on the stored session number ($S_s$) and compares for a match the session number ($S_m$) carried in the first message transmitted on the new connection with the stored session number ($S_s$) and the next session number ($S_{s+1}$) (420). If there is a match between the session number ($S_m$) carried in the first message and either the stored session number ($S_s$) or the next session number ($S_{s+1}$), recipient 120B presumes that the new connection is a re-established connection initiated by one of initiators 110, keeps the new connection, drops the other active connection having one or more common identifiers, sets the session number ($S_s$) stored on recipient 120B for the connection to the session number carried in the first message ($S_m$) (430) and sends an acknowledgment message to the one of initiators 110 including the session number ($S_m$) (430). If, however, there is no match between the session number ($S_m$) carried in the first message and either the stored session number ($S_s$) or the next session number ($S_{s+1}$), recipient 120B presumes that the new connection is a cloned connection from, for example, a computer executing a cloned process or a rogue computer that has gained unauthorized access to the SSL certificate and has spoofed identifiers in order to gain malicious access to recipient 120B. In that event, recipient 120B takes an implementation dependent security action, such as dropping the new connection, dropping the new and old connection, notifying an administrator and/or disabling an account associated with the compromised SSL certificate. Recipient 120B may distinguish the old connection from the new connection on the basis of different TCP port assignments, for example.

Whenever one of initiators 110 receives from recipient 120B an acknowledgement message carrying a session number ($S_m$), the one of initiators 110 knows that recipient 120B has recorded the session number ($S_m$) as the stored session number ($S_s$). Thus, the one of initiators 110 applies the common scheme to determine the next session number ($S_{m+1}$) based on the session number ($S_m$) and sets the current session number ($S_m$) to the next session number ($S_{m+1}$).

Figure 5:
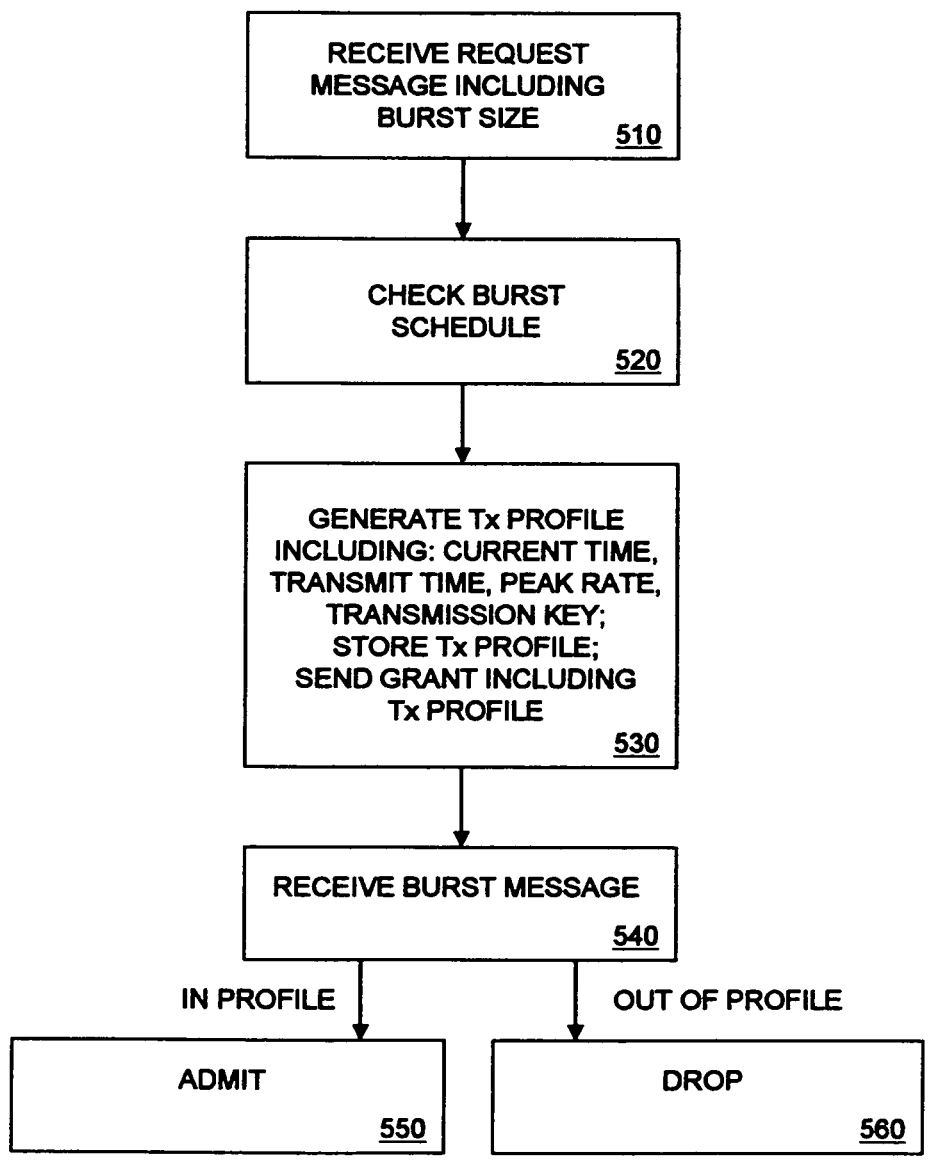
FIG. 5 shows a bandwidth leveling method performed by a recipient in some embodiments of the invention.

FIG. 5 shows a bandwidth leveling method performed by a recipient in some embodiments of the invention. Bandwidth leveling prevents congestion on a recipient that must maintain active logical connections with multiple initiators at the same time. Consider, for example, a situation where recipient 120C maintains an active logical connection with each of initiators 110A, 110B, 110C. Without implementation of a congestion avoidance scheme, initiators 110A, 110B, 110C might simultaneously transmit large data bursts to recipient 120C causing severe congestion on recipient 120C that can lead to data loss and even connectivity loss. Accordingly, bandwidth leveling is implemented on recipient 120C to reduce the risk of severe congestion.

In bandwidth leveling, when one of initiators 110 wishes to send to recipient 120C a data burst that exceeds a predetermined size, such as 10 kilobytes, the one of initiators 110 must first transmit a request to recipient 120C including the burst size. When recipient 120C receives such a request (510), recipient 120C checks a burst schedule that includes information indicative of scheduled data bursts pending on other ones of initiators 110 (520). In some embodiments, the burst schedule also includes information indicative of expected ping messages from initiators 110. Based on information from the burst schedule, recipient 120C creates a transmission profile for the requested data burst including a transmit time, peak rate and transmission key, stores the profile in the burst schedule and sends a grant message including the profile and the current time to the requesting one of initiators 110 (530). In some embodiments, the transmit time and the current time are defined in an hours, minutes, seconds, milliseconds format and the peak rate is defined in bytes per second.

The requesting one of initiators 110 determines how to transmit the data burst in conformance with the profile in the grant message, for example, segmenting the data burst into multiple packets and scheduling transmission of the multiple packets. When a burst message is received from the one of initiators 110 (540), recipient 120C verifies that the burst message includes the transmission key and confirms that the burst message is in-profile, for example, conforms with the transmit time and peak rate stored in the burst schedule. In this regard, recipient 120C may use the transmission key included in the burst message to access the profile, determine whether the burst message is within profile and, if so, update the profile based on the arrival time of the burst message and the size of the burst message or the data therein. Then, if the burst message is in profile, recipient 120C admits the data burst (550), whereas if the burst message is out-of-profile, recipient 120C drops the data burst (560).

In other embodiments, recipient 120C does not verify whether burst messages are in-profile. In these embodiments, initiators 110 are trusted to send in-profile burst messages, which substantially reduces processing requirements on recipient 120C.

In some embodiments, for example, in high speed networks, the transmit time and the current time definitions include microseconds. In other embodiments, for example, low speed networks, the transmit time and current time definitions exclude milliseconds.

In some embodiments, for example, in high speed networks, the peak rate is defined in bytes per millisecond. In other embodiments, for example, low speed networks, the peak rate is defined in bytes per minute.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A communication system comprising:
    an initiator; and
    a recipient communicatively coupled with the initiator,
    wherein the initiator generates and transmits, to the recipient, a message carrying a random session number, wherein the initiator and the recipient apply a common scheme to independently generate, on the initiator and the recipient, a common current session number based on the random session number, wherein the initiator transmits, to the recipient, on a second logical connection, the common current session number generated on the initiator, wherein the recipient compares for a match the common current session number generated on the initiator with the common current session number generated on the recipient, and wherein the recipient drops a first logical connection in favor of the second logical connection in response to the match.

2. The communication system of claim 1, wherein, upon finding the match, the recipient transmits, to the initiator, an acknowledgement message including the common current session number.

3. The communication system of claim 1, wherein the initiator transmits the random session number in the first message transmitted after establishment of the first logical connection, and the initiator transmits the common current session number generated on the initiator in the first message transmitted after establishment of the second logical connection.

4. The communication system of claim 1, wherein the common scheme generates common current session numbers by one of modifying common previous session numbers in accordance with a common algebraic or geometric progression, performing common bitwise logical operations on common previous session numbers or performing common table lookups on common previous session numbers.

5. The communication system of claim 1, wherein, at a ping interval, the initiator transmits, to the recipient, ping messages, and for an acknowledgement interval the initiator receives, from the recipient, acknowledgement messages responsive to the ping messages, and wherein the initiator dynamically adjusts the ping interval based on a count of transmitted ping messages and received acknowledgement messages.

6. The communication system of claim 1, wherein the initiator transmits, to the recipient, on a logical connection, a data burst transmission request including a burst size, and wherein the recipient transmits, to the initiator, in response to the data burst transmission request, a data burst transmission grant including a transmission profile.

7. The communication system of claim 6, wherein the transmission profile includes a current time, a transmit time, a peak rate and a transmission key.

8. A method for verifying a logical connection, comprising:
    receiving, by a recipient from an initiator, a random session number;
    receiving, by the recipient from the initiator, on a second logical connection, a common current session number generated on the initiator based on the random session number and a common scheme;
    independently generating, on the recipient, the common current session number based on the random session number and the common scheme;
    comparing for a match, on the recipient, the common current session number generated on the initiator with the common current session number generated on the recipient; and
    dropping, by the recipient, a first logical connection in favor of the second logical connection in response to the match.

9. In a communication system having an initiator and a recipient coupled over a communication network, the recipient, comprising:
    a processor; and
    a memory associated with the processor, wherein the recipient is configured to receive, from the initiator, a random session number, receive, from the initiator, on a second logical connection, a common current session number generated on the initiator based on the random session number and a common scheme, independently generate, under control of the processor, the common current session number based on the random session number and the common scheme, compare for a match, under control of the processor, the common current session number generated on the initiator with the common current session number generated on the recipient and drop, under control of the processor, a first logical connection in favor of the second logical connection in response to the match.

* * * * *